Dec. 15, 1942.　　　A. N. WOODRUFF　　　2,305,508
CLOCK
Filed Aug. 13, 1940　　　3 Sheets-Sheet 1

Inventor
Albert N. Woodruff
By Munn, Anderson & Liddy
Attorneys

Dec. 15, 1942.  A. N. WOODRUFF  2,305,508
CLOCK
Filed Aug. 13, 1940  3 Sheets-Sheet 2
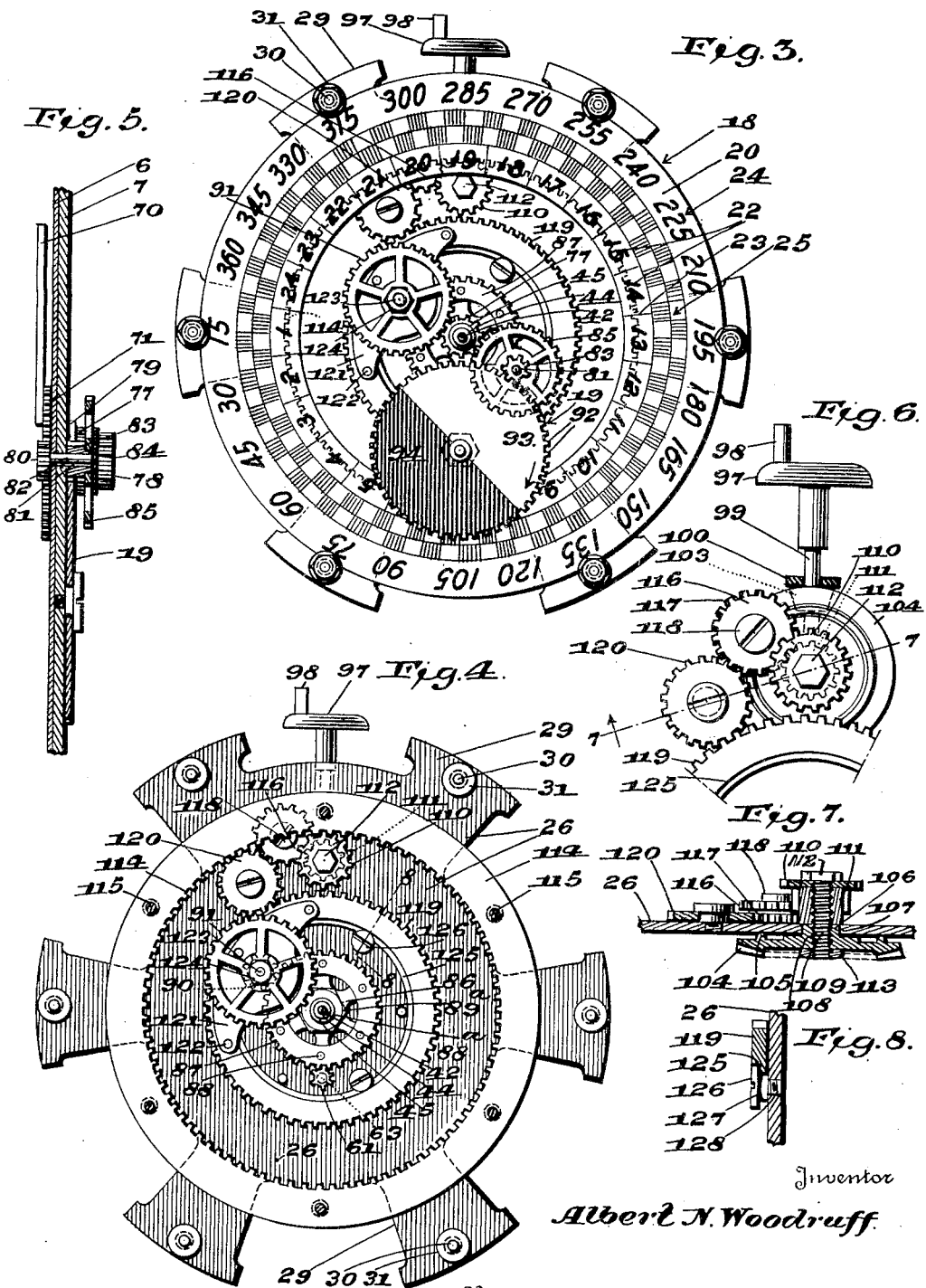
Inventor
Albert N. Woodruff
By Munn, Anderson & Liddy
Attorneys Dec. 15, 1942.  A. N. WOODRUFF  2,305,508
CLOCK
Filed Aug. 13, 1940  3 Sheets-Sheet 3
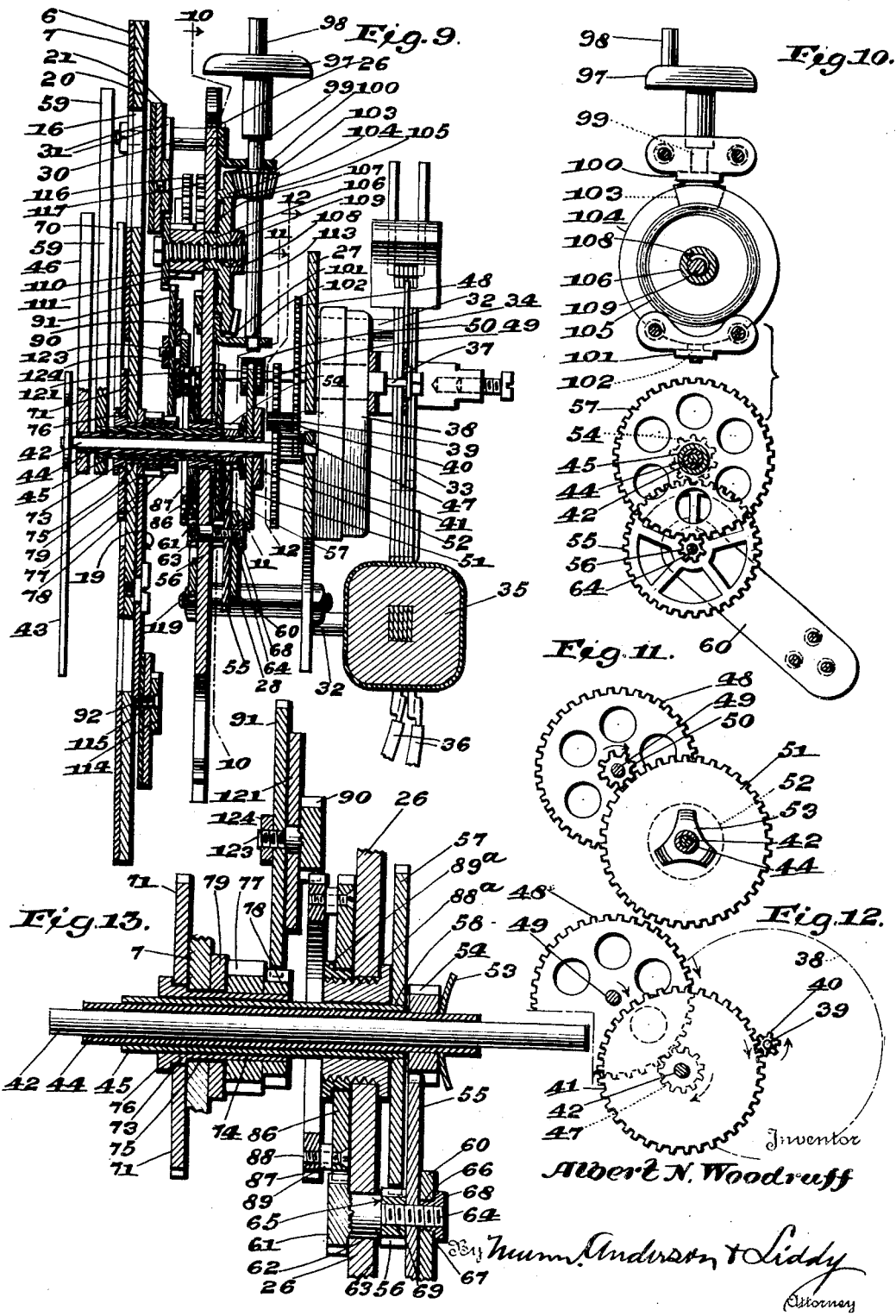
Inventor
Albert N. Woodruff
By Munn, Anderson & Liddy
Attorney Patented Dec. 15, 1942

2,305,508

UNITED STATES PATENT OFFICE 2,305,508

CLOCK

Albert N. Woodruff, Washington, D. C.

Application August 13, 1940, Serial No. 352,442

9 Claims. (Cl. 58—43)

This invention relates to improvements in clocks, and its broad purpose is to serve the needs of both laymen and technicians.

A clock of this type is well adapted to be located in a commanding position in the living room of a home so that it can be consulted not only for the local time in conjunction with the turning on and off of a conventional radio or for any other purpose that requires a knowledge of the local time, but which can also be consulted for a determination of the local time in some remote locality, thereby to make known to one or more interested persons what the actual time is at the source of any given radio program.

In the second instance the use of the clock is much more of a technical nature. It seems unnecessary to list here the various branches of scientific endeavor in which the clock will prove useful, the chosen illustration of navigation being deemed sufficient to convey the idea in mind. Persons acquainted with the technical aspects of navigating a seagoing vessel know that virtually every calculation required to be made demands a knowledge of the local date and time as an indispensible factor preliminary to the use of the Nautical Almanac.

This computation requires a knowledge of the exact local time which, of course, can be had where possible, from the local observatory other than the instant clock. But the latter is contrived to continuously indicate the Greenwich time, and thus supplies an indispensible factor in the determination of the local time which might or might not check with the particular indication of local time supplied by the clock. The obtaining of the foregoing factor involves the use of the graduated circle, the function of which is later described in detail. With this premise in mind attention is directed to the specific objects of the invention which are as follows:

First, to provide a clock which is desirably identified herein as a radio model, partly for the purpose of distinction from Patents 1,990,012, Feb. 5, 1935, and 2,143,814, Jan. 10, 1939, of Albert N. Woodruff, and partly because said model is peculiarly adapted to use in conjunction with the transmission and reception of radio programs of virtually all kinds.

Second, to provide a clock which may and desirably will be used in conjunction with a radio instrument in the continuous indication of the Greenwich time, these being primary factors in determining the exact local time, the latter being used in nearly every nautical computation and an essential preliminary to the use of the Nautical Almanac.

Third, to provide a clock which continuously indicates the Greenwich civil time and thus supplies a predetermined factor for the purpose of computing the exact local time and this either by a navigator or avigator in the finding of his position and in respect to the surface of the globe.

Other objects and advantages will appear in the following specification, reference being had to the accompanying drawings in which:

Figure 3 is an elevation of the mechanism immediately beneath the dial in Fig. 2, more specifically the graduated circle and associated parts.

Figure 4 is an elevation similar to Fig. 3 showing the parts as they appear after the removal of the graduated circle.

Figure 5 is a cross section taken on the line 5—5 of Fig. 2, partly showing the local hour hand driving mechanism.

Figure 6 is a detail elevation of the graduated circle operating means.

Figure 7 is a cross section taken on the line 7—7 of Fig. 6.

Figure 8 is a detail cross section taken on the line 8—8 of Fig. 4.

Figure 9 is a vertical section taken on the line 9—9 of Fig. 2.

Figure 10 is a vertical section taken on the line 10—10 of Fig. 9.

Figure 11 is a detail section taken on the line 11—11 of Fig. 9.

Figure 12 is a detail section taken on the line 12—12 of Fig. 9.

Figure 13 is an enlarged section of the hand-driving assemblage.

Figure 1:
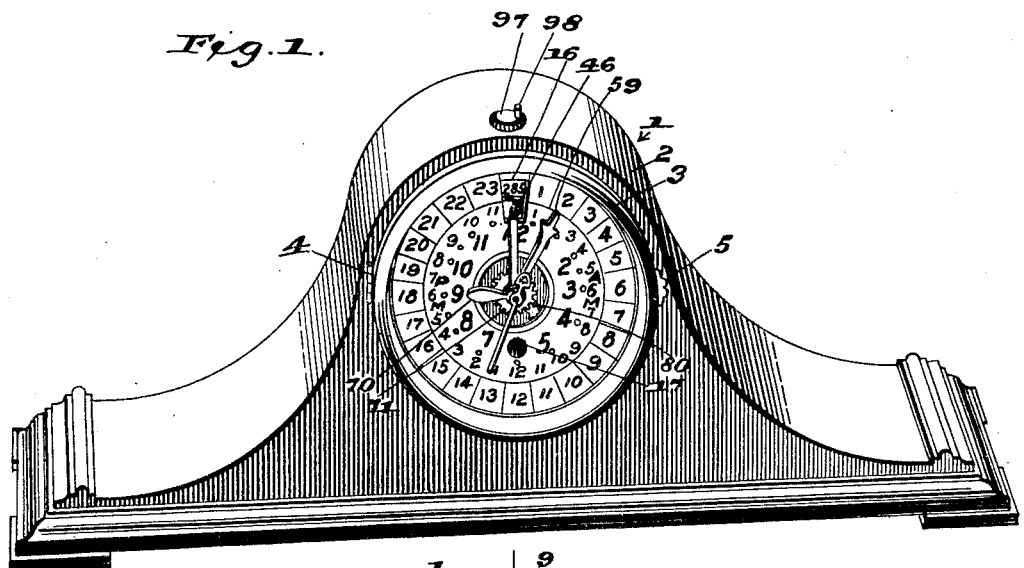
Figure 1 is a perspective view of the improved clock, showing its emplacement in a case of a type which will make the time-piece suitable for use in a living room.
Figure 2:
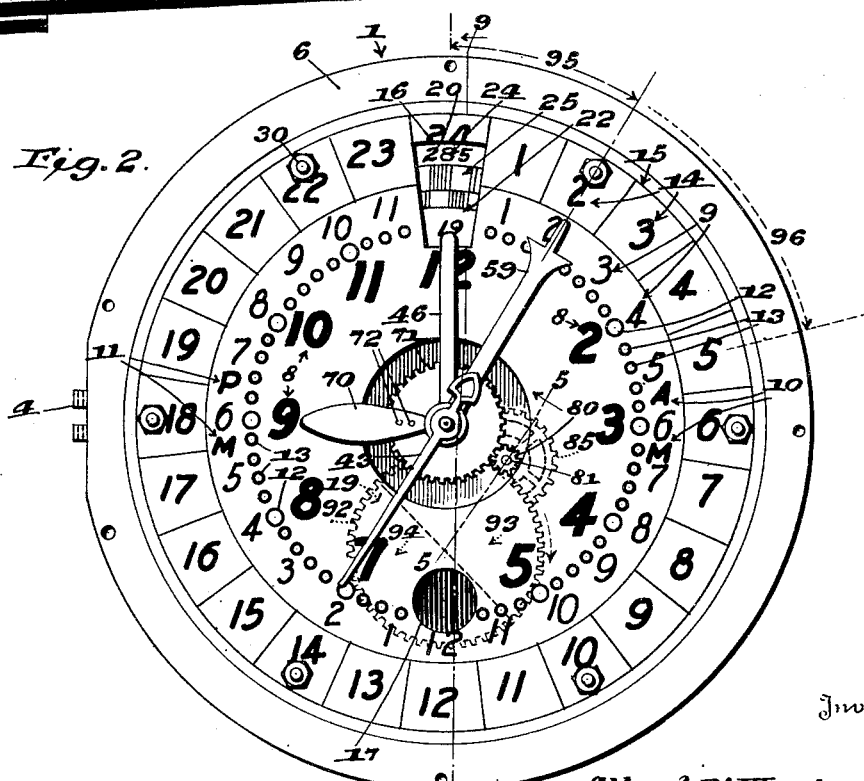
Figure 2 is a front elevation of the dial and illustrating the assemblage approximately as it would appear in use on board a ship.

Reference is first made to Fig. 2 wherein the clock is generally designated 1. The purpose of this designation is to identify the clock in its entirety and apart from the case (Fig. 1) in which it may be emplaced. The clock 1 (Fig. 2) will in practice also be encased and when used aboard ship said case will usually consist of a cylindrical brass housing made perfectly tight so as to exclude moisture-laden air as far as possible. When using the clock in a home it is generally desirable to provide the more or less ornamental case 2 shown in Fig. 1. This arrangement of clock and case is adaptable to virtually any living room, but obviously the specific design of case shown in Fig. 1 does not have to be adhered to.

In virtually all instances provision is made of a door 3 which comprises a glazed ring. The ring door is hinged at 4 on one side and provided with an appropriate catch 5 on the other side. From here on the description is confined to the clock itself, no further reference being made to the relatively immaterial clock case. The dial 6 in Fig. 2 consists of an appropriate sheet which is backed by a plate 7 (Fig. 9). The dial plate 7 is desirably made of brass, and it has the dial 6 firmly secured to the front face of it by means of cement. The dial 6 is preferably white and the inscriptions upon it are as follow.

A circumferential series of fairly large numerals 8 will designate the local time. These numerals run from 1 to 12 according to custom, excepting that in this instance the numeral 6 is omitted because of the presence of a hole at that place. A second circumferential series of numerals 9 comprises what is herein known as the Greenwich hour zone. This zone has places for twenty-four numerals, there being an exception in the instance of the 24th numeral, which is occupied by an opening. The numerals in the second series comprise two groups running from 1 to 12, note being made again of the absence of the numeral 12 in the second group, said numeral being the 24th of the collective second series.

The purpose of thus separating the two groups is to set apart the A. M. side 10 on the right from the P. M. side 11 on the left. The two groups are conveniently designated by the A. M. and P. M. legends shown. A circumferential series of dots 12, 13, provides a line of demarcation, in a sense, between the numerals 8 and 9. The large dots 12 are radially emplaced in line with the numerals 8 of the local time zone. The small dots 13 are so spaced between the large dots as to designate minute divisions of time.

A third circumferential series of numerals 14 comprises what is herein known as the Greenwich or universal time zone. These numerals are desirably boxed off in a circular grid 15, one of the purposes of which is to distinguish the Greenwich time zone 14 from the Greenwich hour zone 9. An outstanding distinction is that the grid 15 is spaced for 24 hours. The numerals 14 run consecutively from 1 to 24, the 24th numeral partly encroaching upon the previously mentioned opening.

This opening is now designated 16. The previously mentioned hole is designated 17. The opening and hole go clear through the dial 6 and plate 7 (Fig. 9) so as to reveal portions of the graduated circle 18 (Fig. 3) and of the day-night disk 19. The graduated circle 18 is subject solely to manual operation, while the disk 19 is subject solely to clock mechanism operation. The graduated circle 18 consists of a ring dial 20 which is backed by a brass ring plate 21 (Fig. 9). The two are cemented together, and the ring dial 20 is inscribed in the following manner. A circumferential series of numerals 22 nearest the inside perimeter of the graduated circle 18 denotes local time zones. These zones are desirably boxed off in a circular grid 23. They run consecutively from 1 to 24 without interruption and they are adapted to appear at the bottom of the dial opening 16 (Fig. 2).

A second circumferential series of numerals 24 appears next to the outside perimeter of the graduated circle 18 (Fig. 3). These numerals are intended to indicate degrees of longitude east of Greenwich. They comprise the whole circumference of the globe, and are based on only one direction of progression from Greenwich, namely, toward the east. To this end said numerals conveniently start at 15, and then are stepped off by increases of fifteen until the zero or 360 position is reached. On the same plan the local time zones are cumulatively numbered from Greenwich toward the east, and logically so because the time periods of any given day and in any given locality build progressively as the globe rotates toward the east. The time zone in which a particular locality is situated must be determined from the longitude of the locality and since Washington, D. C. is located in the nineteenth time zone the ring 18 is turned until the numeral 19 appears at the opening 16.

In order to account for the intermediate degree positions a circumferential scale 25 is emplaced between the numerals 22 and 24. Portions of this scale appear at the approximately middle height of the opening 16 (Fig. 2) while the numerals 24 successively appear at the top of said opening.

The graduated circle 18 is shown set for the 19th time zone, previously stated as being that of Washington, D. C., but it will be obvious that this is merely an arbitrary setting, any and every change desired being accomplished by the operating means in Fig. 6.

Reverting to the numerals 22 it is stated in further explanation that these are intended to agree with the hour meridians stepped off at 15 degree intervals from the Prime Meridian, commonly accepted as running through Greenwich which is considered as being in the twenty-fourth time zone. Since the numerals 24 match the radial positions of the numerals 22, the reader will understand that when a given numeral 22 of the local time zone is made to appear at the opening 16 (Fig. 2), that circumstance is accompanied by the appearance of a designation of the longitude at which said time zone is centered.

To make this statement clear the adopted 19th time zone is used as a further example. The indicia matching the numerical designation of this time zone reads 285 (Fig. 2). This means that the 19th time zone is centered at the meridian 285 degrees remote from the Prime or Greenwich Meridian, reading in the east direction. On the same principle a rotation of the graduated circle 18 until the indicia 75 appears at the top of the opening 16 will be accompanied by the appearance of the numeral 5 in the local time zone 22. This means that when the numeral 24 which designates the 75th meridian is brought to view in said opening 16, the observer will know that the observation is being made with respect to the 5th time zone.

For the purposes of the instant clock Washington, D. C. actually is located on the 283° Meridian East of Greenwich, corresponding with the currently adopted 77° Meridian West of Greenwich.

At this point it is desired to explain that the International Date Line is eliminated insofar as the use of this clock is concerned. Instead of reading the meridians in east and west longitude from the Prime (Greenwich) Meridian to meet half way around the globe at the International Date Line according to present practice, only a uni-directional reading is contemplated herein, namely, east of Greenwich, thus accounting for the progressive rotation of the numeral series 24. Before explaining the operation of the graduated circle turning means in Fig. 6, it is desired to introduce more of the clock mechanism.

A plate 26 herein conveniently known as the upper plate, is held rigidly with respect to a base plate 27 (Fig. 9) by means of a plurality (usually 4) of spacers 28. The plate 26 is not necessarily made in the shape depicted in Fig. 4, but it desirably is formed with a plurality of radial arms 29, each of which provides the mount for a guide pin 30. There are six of these guide pins, and they are flanged at 31 to contain and guide the smooth external perimeter of the graduated circle 18 (Fig. 3). Said circle is supported and guided solely by said guide pins and flanges.

Suitable spacers 32 (Fig. 9) rigidly support the field pieces 33 of a rotor 34. The field is energized by a coil 35 which has wires 36 adapted to be connected with a source of electrical current. The rotor 34 is carried by a shaft 37 which projects from the rear of a reduction gear box 38. This rotor, etc. is identical with the rotor of any known electric clock and more of the details than already given is thought unnecessary.

The shaft 39 is to be understood as a shaft capable of being driven otherwise than by electrical power; it can be a spring driven shaft. It carries an 8-tooth pinion 40 (Fig. 12). Said pinion meshes with and drives a 64-tooth gear 41 which is integrally affixed to the inner end of the shaft 42 of a second hand 43. As is characteristic with all electric clocks, the shaft 42 rotates continuously, thereby causing the second hand to continuously traverse the dial 6. This is done at the rate of one revolution per minute.

The shaft 42 comprises the core of a driving tube assemblage (Fig. 13). Said assemblage comprises two tubes respectively designated 44 and 45. The innermost tube 44 carries what is known as the Greenwich minute hand 46. This hand also comprises the local minute hand because its purpose is to indicate the passing time in minutes, this being a requirement in consulting the clock both for Greenwich and local time. It has motion in reference to the indicia 12, 13 (Fig. 2) which, as previously indicated, are spaced at minute intervals.

The minute hand tube 44 is rotated at the rate of one revolution per hour by means of a gear train which begins at an 8-tooth pinion 47 on the shaft 42 immediately in back of the gear 41 (Fig. 12). Said pinion meshes with and drives a 60-tooth gear 48 on a countershaft 49. The ends of this shaft are journaled upon the upper and base plates 26, 27. It carries an 8-tooth pinion 50 in mesh with a 64-tooth gear 51 which is frictionally carried by the inner end of the minute tube 44. The purpose of frictionally carrying the gear 51 is to enable setting the minute hand 46 independently of the clock work by merely taking hold of the minute hand and moving it to the required angular position to indicate the exact time insofar as minutes are concerned.

At such a time the gear 51 as well as the entire train behind it remains stationary. Said gear is held against an abutment disk 52 by a fingered spring disk 53 (Fig. 11). The abutment 52 is made rigid on the inner end of the tube 44. The disk 53 is merely emplaced on the tube between the opposite side of the gear 51 and a 12-tooth offtake pinion 54 firmly affixed to the tube 44. Said pinion meshes with and drives a 48-tooth gear 55 (Fig. 10) which carries an 8-tooth pinion 56 in mesh with a 48-tooth gear 57. Said gear 57 is fixedly attached at 58 (Fig. 13) to the inner end of the tube 45 which on its outer end carries the Greenwich hour hand 59. This hand cooperates with the Greenwich time zone 14 (Fig. 2) from which it may be deduced that said hand 59 rotates around the dial 6 once in twenty-four hours.

Upon manually moving the minute hand 46 in the manner and for the purpose stated above, motion will also be imparted to the hour hand 59 by the same manual effort. This effort is traced from the pinion 54, which it will be remembered can be manually turned without affecting the gear 51, through the gear 55, its pinion 56 and the gear 57. Since the latter is fixedly carried by the tube 45 it is readily understandable that the hand 59 must move in consequence of the manual turning.

The gear 55 is supported in part by a bracket 60 (Fig. 10) and in part by the upper plate 26. The specific support involves an 8-tooth pinion 61 which appears on the upper side of the plate 26 (Fig. 13). Said plate has a hole 62 in which the boss 63 of the pinion 61 has bearing. Said boss has a threaded extension 64 which because of its reduced diameter provides the boss 63 with a shoulder 65. The bracket 60 has a hole 66 which is occupied by the sleeve 67 of a nut 68. Prior to screwing the extension 64 into the nut 68 it is screwed into the threaded bore 69 of the previously mentioned pinion 56 and of the gear 55. The gear 55 and pinion 56 are rigidly connected to each other by brazing or otherwise, and when the extension 64 is screwed home in the pinion and gear and the nut 68, these parts as well as the pinion 61 are converted into a unit so that the turning of the gear 55 by means of the pinion 64 is accompanied by a turning of the pinions 56 and 61 and of the nut 68.

Since the sleeve 67 of the latter has bearing in the hole 66, it is readily seen that said unit has an adequate turning support between the plate 26 and the bracket 60.

In addition to the three hands described thus far provision is also made of a local hour hand 70 (Fig. 2). This hand, as its name implies, is intended to indicate the local hour in the local time zone 8. Since the latter is arranged on the conventional twelve hour basis it follows that the hand 70 rotates around the dial 6 once every twelve hours. Said hand is carried by a 40-tooth gear 71 to which said hand is firmly affixed in any desired way, for example, by means of pins 72 (Fig. 2). The gear 71 is journalled upon the hub 73 of a sleeve 74 (Fig. 13) which in turn is journalled in an opening 75 in the dial plate 7. The hub 73 has an outer enlargement 76 which constitutes an abutment for the gear 71. The latter is journalled upon the hub 73 between the plate 7 and the abutment 76. The sleeve 74 provides a bearing for the previously mentioned tube assemblage, it being the tube 45 which has actual bearing contact with the sleeve 74. The latter has two 12-tooth pinions 77, 78, affixed to it. Pinion 77 is of larger diameter than pinion 78 and these pinions have teeth at different pitch. The pinion 77 desirably rubs against a metal pad 79 which is affixed to the plate 7, and serves to space the pinions 77, 78, the requisite distance from the plate 7.

It will be noted that the number of teeth shown on the gears in the drawings does not coincide usually with the number of teeth designated in the specification, and this is due to the fact that the number of teeth on the gears on the drawings is not always accurate since the gears are shown diagrammatically.

Driving motion is imparted to the gear 71 by a 10-tooth pinion 80 (Figs. 2 and 5). Said pinion is affixed to the outer end of a shaft 81 which is journalled in a hole 82 in the dial plate 7. The inner end of the shaft 81 has 9-tooth pinion 83 affixed to it. Said pinion has a hub 84 (Fig. 5) to which a 36-tooth gear 85 is affixed. The gear 85 meshes with the large pinion 77 (Fig. 3).

Driving power for the local hour hand 70 is derived from the pinion 61. Said pinion meshes with the inner one 86 of a double faced 48-tooth gear 86, 87. Novel mechanical characteristics make it desirable to employ the twin gears 86, 87 in lieu of a single gear with a double face. The inner and outer gears 86, 87 are secured together at 88 through spacers 89. The pinion 61 meshes only with the inner gear 86 (Fig. 13). Bearing for the double-faced gear is provided by a sleeve 88a and a nut 89a (Fig. 13). These members are screwed together, the effect being to bind them tightly upon the plate 26 which has a hole to accommodate the sleeve 88a. Said members 88a, 89a, are thus affixed to the plate 26. The sleeve 88a provides a bearing for the shaft and tube assemblage while the nut 89a provides a bearing for the gear 86.

The outer gear 87 meshes with and drives an 8-tooth pinion 90. Said pinion carries a 48-tooth gear 91 which meshes with the small pinion 78. Thus the driving power for the local hour hand 70 is traced from the pinion 61 (Fig. 13) through the double-faced gear 86, 87, the pinion and gear 90, 91, to the pinion set 77, 78. Since the pinion 77 is in mesh with the gear 85 (Fig. 3) and the latter carries the pinion 80 although it does so indirectly (Fig. 5), it follows that the local hour hand 70 is set in motion because of the meshing of the pinion 80 with the gear 71 that carries said hand.

In order to indicate whether the period of time indication by the hand 70 is day or night, the previously mentioned day-night disk 19 is driven from the shaft 81 (Fig. 5) simultaneously with the driving of the hour hand 70. For this purpose the disk 19 actually comprises a 72-tooth gear 92. Said disk is driven by the 9-tooth pinion 83 which is in mesh with the gear 92. The front surface of said disk is divided into white and black segments 93, 94, obviously indicating day and night. Said surface of the disk is seen in part through the hole 17 in the dial 6. According to the present setting of the clock in Fig. 2, the local time is 9:00 o'clock p. m. Consequently the black segment 94 appears at the hole 17. The time at Greenwich is 2:00 a. m. and since the Greenwich hour hand 59 has passed the vertical center of the dial 6 the observer will understand that the new day as indicated at 95 has progressed two hours.

The indication provided by the Greenwich hour hand 59 will be that of the new day until it reaches the position 96. This signifies the addition of three hours to the 2 a. m. position at 95, in other words, the passage of three hours local time between the 9 p. m. position of the hour hand 70 and the arrival of that hand at the 12 o'clock midnight position. Thus it will be understood that when the local hour hand 70 denotes 12 o'clock midnight local time, the Greenwich hour hand 59 will denote 5 o'clock a. m. Greenwich time. The new day thus begins with respect to local time whereas five hours of the new day have elapsed according to Greenwich time.

The graduated circle 18 comprises a gage, or an index so to speak, to apprize the operator how far to carry an adjustment in the determination of the time at a remote place. To make this clear, it is assumed that the time in Washington, D. C., is 9 p. m. Now if it is desired to know the corresponding time in such a locality as St. Louis, Mo., U. S. A., the graduated circle 18 is turned until the graduation 90 in the scale 25 shows at the top of the opening 16. The numeral for the local time zone will be 18, thus denoting that St. Louis is in the 18th time zone to the east of Greenwich. At the same time the hour hand 70 will be readjusted in position by gearing hereinafter described until it designates 8 p. m., representing a difference of one hour in time.

It will be clear from the above that applicant has numbered his time zones from 1 to 24 inclusive with Greenwich being in the twenty-fourth zone instead of the usual divisions wherein the time zones are designated by the numerals 0 to 12 inclusive going westward to the international date line after which the time zones are designated from 12 to 0 around the remaining portion of the globe. The proper manipulation of the clock will indicate the time zone so that the proper hour is registered on the dial. Nevertheless the proper day will not be indicated due to the fact that a day must be added or subtracted when crossing the international date line.

The foregoing purposes are accomplished by the following means: a thumb wheel 97 is located in an easily accessible position at the top of the clock case 2 (Fig. 1). The specific details of this thumb wheel are disclosed in the Woodruff Patent 2,143,814. An instant improvement thereto is the addition of an upstanding pin 98 which provides for the rapid rotation of the thumb wheel. In other words, the pin 98 constitutes a crank, and the need for rapidity of rotation is to quickly bring the graduated circle 18 to the desired adjustment with respect to the opening 16 (Fig. 2).

A shaft 99 (Fig. 9) is surmounted by the thumb wheel 97. Said shaft is supported by bearings 100, 101, on back of the upper plate 26. The lower bearing 101 is a step bearing against which the shouldered bottom terminal 102 of the shaft 99 rests.

Said shaft carries a pinion 103 in mesh with a gear 104. The gear 104 has a circular rib 105 on its back, riding against the upper plate 26 to both stabilize said gear and to reduce its frictional bearing against said plate to the minimum. The gear 105 has a hub 106 which revolves in a hole 107 in the plate 26.

A threaded bore 108 in the gear 105 and its hub 106 contains part of a screw 109 which is driven through a 24-tooth gear 110, a 16-tooth gear 111 and then through the hub 106. The head 112 of the screw is driven hard against the gear 110 whereupon the screwing on of the nut 113 makes a unitary assemblage of the gears 104, 111 and 110, said assemblage being adapted to rotate as a unit.

The gear 110 meshes with the internal teeth of a 144-tooth ring gear 114 (Fig. 4) which is fixedly secured at plural places 115 to the back of the graduated circle 18 more specifically to the ring plate 21 (Fig. 9). Thus the manual rotation of the thumb wheel 97 will produce a turning of the graduated circle 18, but simultaneously with the latter operation it is intended to move the local hour hand 70. This is accomplished by the following gearing:

The gear 111 meshes with a 24-tooth gear 116 (Fig. 6) which is appropriately affixed to a 25-tooth gear 117 immediately beneath. These gears revolve as one being commonly mounted on a screw stud 118 driven into the plate 26. The primary purpose of the gear 117 is to turn a 96-tooth gear 119, but this function is delegated to a 24-tooth idler 120, the necessity for which arises from the requirement of having the hour hand 70 move in the same direction as the graduated circle 18 according to either direction of rotation of the thumb wheel 97.

To explain this point, a clockwise rotation (looking down on it) of the thumb wheel 97 will result in a clockwise turning of the gear 119 and a counter-clockwise turning of both the hour hand 70 and the graduated circle 18. Conversely a counter-clockwise turning of the thumb wheel will result in a reversal of directions so that the hour hand 70 will be moved in the clockwise direction while the graduated circle 18 will be turned likewise.

In either direction of turning of the graduated circle, one revolution thereof is accompanied by 2 revolutions of the local hour hand 70 to match the conventional 12-hour local time zone 8. Therefore the function of the 25-tooth gear 117 is to cause 2 revolutions of the local hour hand to one revolution of the graduated circle. The hour hand 70 is thus kept in step, so to speak, with the graduated circle, remembering that the 24-hour amplitude of the hour hand 70 must be coordinated with the 360° angularity of the scale 25.

The driving coordination between the graduated circle 18 and the local hour hand 70 is traced from the gears 111, 110 (Fig. 9). Said gears are rotated as a unit through the gear 104 when the pinion 103 is revolved by means of the thumb wheel 97. Gear 111 actuates gear 116 which by means of its companion 117 turns the idler 120 (Fig. 6). Said idler turns the gear 119 and by the planetary motion of its carried gear set 90, 91 around relative stationary gear 87 revolves the pinion 77. The latter revolves the gear 85 which in carrying the pinion 80 (Fig. 5) revolves the gear 71 and its local hour hand 70. At the same time the gear 110 drives the gear 114 of the graduated circle 18.

The previously mentioned gear 91 (Fig. 3) is carried around with the gear 119 as the latter is rotated by means of the idler 120. Said gear 91 is journalled on a bracket 121 which is riveted at 122 to the gear 119 in sufficiently spaced relationship to accommodate the virtually integral pinion 90. Said pinion has a shouldered shaft 123 (Fig. 9) to the threaded end of which is screwed a nut 124. The arrangement holds the gear 91 and pinion 90 together as a gear set, but provides for the free turning of the two with respect to the bracket 121. The gear set 90, 91 has a planetary motion around the relatively stationary gear 87 as previously explained. The details are shown very clearly in Fig. 13. The gear 119 is a ring gear, and it has an internal rabbet 125 (Fig. 8) at which the heads and shoulders 126, 127 of studs 128 have bearing to support said gear against the plate 126.

The operation is readily understood. It is desired to consecutively trace the source of power under which the various hands are actuated in order to avoid the necessity of reading through the respective portions of the description which, necessarily, are replete with incidental details.

First, the second hand 43 is driven continuously by power applied to its shaft 42 from the motor 38 by way of the pinion 40 on the driving shaft 39, and the gear 41 on the second-hand shaft 42.

Second, the Greenwich minute hand 46 is driven by the motor 38 by power taken from the shaft 42 by way of the pinion 47 on said shaft and the meshing gear 48 on the countershaft 49. Said shaft carries the pinion 50 which meshes with and drives the gear 51 on the minute tube 44. Said gear 51 it will be remembered, is held frictionally on the tube so that manual adjustment of the minute hand 46 will not disturb the gearing behind it.

Third, the Greenwich hour hand 59 is driven by the motor 38, but more remotely therefrom than the others by means of the pinion 54, fast on the tube 44, in mesh with the gear 55 which in turning carries its virtually integral pinion 56 with it, thus to turn the hour tube 45 because of the latter fixedly carrying the gear 57 in mesh with the pinion 56.

Fourth, the local hour hand 70 is most remote from the driving motor 38. The tracing of its power may be limited to the pinion 61 (Fig. 13). Said pinion is one member of the unit 55, 56, 61, of which the pinion 56 was recently described as being the driver for the hour tube 45. Said pinion 61 drives the double-faced gear 86, 87, the member 87 of which drives the sleeve 74 through the train 90, 91, 78, 77.

Said sleeve 74 is independent of the gear 71 despite the fact that it is the latter which carries the local hour hand 70. Motion is transmitted to the latter from the sleeve 74 by means of the gear 85 (Fig. 5) in mesh with the pinion 77. The shaft 81 which carries the gear 85 also carries the pinion 80 and since it is the latter that is in mesh with the gear 71 it is readily seen how the local hour hand is made to move.

Simultaneously with this movement of the local hour hand the day-night disk 19 (Fig. 3) is made to move in back of the hole 17 (Fig. 2) by means of its gear 92 in mesh with the pinion 83 on the previously mentioned shaft 81.

Fifth, in reverting to the manual adjustment of the minute hand 46 it will be remembered that the purpose of frictionally holding gear 51 is to allow said setting without disturbing the gearing behind it. Said adjustment of the minute hand 46 also affects the Greenwich hour hand 59 and also the local hour hand 70, and necessarily so, because the positions of these hands should be properly distributed with respect to each other.

So in manually moving the minute hand 46 motion is imparted to the gear 55 by means of the pinion 54 fast on the tube 44, transmission being made through the pinion 56 (Fig. 13) to the gear 57 on the tube 45 and consequently to the Greenwich hour hand 59.

Since the pinion 61 (Fig. 13) responds to the movement imparted by the gear 55 it follows that the double-faced gear 86, 87, will turn on its bearing. Both the pinion 90 and gear 91 will turn, transmitting motion to the sleeve 74. The pinion 77 of the latter thus turns the gear 85 and since the latter is coupled with the pinion 80 (Fig. 5) and said pinion 80 meshes with the gear 71, it follows that the local hour hand 70 will be adjusted in response to the motion of said gear 71.

Now dealing with the normal use of the clock it must be clear that as long as the motor 38 remains in operation, the second hand 43 will traverse the dial 6 once every minute; the hand 46 will traverse the dial once every hour; the hand 59 will traverse the dial once every 24 hours while the hand 70 will traverse the dial once every 12 hours. Thus the rates of the hands 46, 70 and 59 is 24:2:1 in a 24-hour period.

Having made clear the mechanical functioning of the clock, it is desired to conclude this description with a brief summary of its fundamental purpose. It must be apparent that the indication of the local time by the hour and minute hands 70, 46, must be subject to error if the user of the clock fails to reset the hands when passing over the hour meridians. Thus the clock may indicate 9 p. m. (Fig. 2) which may be correct for the zone of one hour meridian, whereas actually the time may be either 8 or 10 p. m. should the user have failed to reset the hands in passing onto the next time zone.

But the Greenwich hour hand 59 does indicate the correct hour as of Greenwich, based on the presumption that the clock mechanism is in accurate operation, the indication of the Greenwich hour hand 59 then being used for a resetting of the local hour hand 70 in establishing the exact local time.

This is done by adjusting the graduated circle 18. First it is necessary to determine the degree position of the conveyance with respect to the surface of the globe. This is done by the commonly used principle of dead reckoning. The thumb wheel 97 is then turned until the degree indication 24 shows at the opening 16. The changed local time indication 22 will also appear, but in the process of turning the graduated circle 18, the local hour hand 70 responds to a resetting so that it indicates the exact local hour.

I claim:

1. A clock comprising a dial having a plurality of concentric sets of numerals arranged on the following order: a twenty-four hour universal time zone numbered from 1 to 24, a twelve-hour local time zone numbered from 1 to 12, a Greenwich time zone located between the foregoing zones, being separated into A. M. and P. M. sides and spaced for twelve hour divisions on each of the sides, a series of measured indicia concentric to the numeral sets and dividing the local and Greenwich time zones, a local hour hand confined to the local time zone, a Greenwich hour hand adapted to traverse both the universal and Greenwich time zones, a minute hand working in conjunction with both hour hands, a single power source for all of the hands, and a gear train for each of the hands, all of said trains converging upon said single power source and moving the minute, local hour and Greenwich hour hands on a ratio 24:2:1 in a twenty-four hour period.

2. A clock comprising a dial, hour and minute hands to traverse the dial, a motor having a minute gear train coupled to and driving the minute hand, an offtake pinion situated in said train, and an hour gear train coupled to the hour hand and taking its power from the minute gear train, said hour gear train comprising a gear unit consisting of a gear and pinion, said gear being in mesh with the offtake pinion, a double faced gear consisting of two connected thin gears, one of which is in mesh with the unit pinion, a gear and pinion couple of which the pinion is in mesh with the other thin gear, a gear to which the hour hand is attached, and a set of pinions meshed in train form from the hour hand gear to the gear of said couple.

3. A clock comprising a dial, hour and minute hands to traverse the dial, a driving tube assemblage to one tube of which the minute hand is attached, a motor providing the power source for the minute hand and having a minute gear train terminating at said one tube, an offtake pinion connected to said tube, two bearings for said tube assemblage, and an hour gear train coupled to the hour hand and taking its power from the minute gear train, said hour gear train comprising a gear unit consisting of a gear and pinion, said gear being in mesh with the offtake pinion, a double faced gear consisting of two connected thin gears, one of which is journaled on one of the two bearings and is in mesh with the unit pinion, a gear and pinion couple of which the pinion is in mesh with the other thin gear, a gear to which the hour hand is attached, said gear being journaled on the other one of the two bearings, a pair of pinions of which one is in mesh with the hour hand gear, and pinion means affixed to said other bearing, being in mesh with the other one of said pair of pinions and with the gear of said couple, causing incidental turning of the respective bearing but avoiding interference with turning of the tube assemblage.

4. In a clock, a pair of plates in confronting and spaced relationship, a driver tube and shaft assemblage in telescopic relationship and spanning the distance between said plates, a bearing affixed to one of the plates for the support of one end of the assemblage, and a bearing revoluble in the other plate for the support of the other end of the assemblage.

5. In a clock, a dial having two sets of numerals thereon, a hand for each set of numerals, a revoluble driver member to which one of the hands is secured, a gear to which the other hand is secured, a revoluble sleeve in which the driver member is journaled and upon which said gear has bearing, and a gear train between said sleeve and gear for rotating the gear by the revolution of the sleeve.

6. In a clock, a pair of hands, separate means for rotating the hands independently, said means consisting of a revoluble driver member to one end of which one of the hands is secured, a pair of fixed supports, a bearing on each support for the driver member, one bearing being clamped tight the other being rotatable, and a gear train for moving the other hand, said train including components secured respectively to the other end of the driver member, journaled on the tight bearing, secured to the rotatable bearing to cause the rotation, and journaled independently on the rotatable bearing, the latter component having the other hand secured thereto.

7. In a clock, at least one fixed support having a hole therethrough, a revoluble driver member, bearing means for said member including a sleeve occupying the hole and a nut secured to the sleeve, the sleeve and nut being clamped tightly against the support and the nut having a shoulder, and a driver train of which said member is a part, said train also including a double gear consisting of two gears secured together, one of the gears being journaled on the shoulder, the other gear standing out beyond the nut.

8. In a clock, a dial having an opening and a sequence of numerals to be consulted for a 24-hour period, an hour hand to traverse the dial and its numerals, a ring graduated in the 360° of a circle, said graduations being supplemented with numerals periodically numbering the graduations and other numerals spacing off the graduations in hour time zones, a small portion of the graduations and numerals being visible in said opening, a clockwork culminating at the hour hand and regularly moving said hand at a measured rate in respect to the dial and graduated ring, a manually operable gearing culminating both at the graduated ring and at said hand for accomplishing the movement of the hand independently of the clockwork and at the same time moving the ring, and a shaft for actuating the gearing having a thumbwheel for making small but accelerated movements of the hand and ring, said thumb-wheel having a crank pin for rapidly turning the shaft and spreeding the adjustments of the hand and ring.

9. In a clock, a fixed support having a hole, a shaft mounted on said support crosswise of the hole, said shaft carrying a pinion, gears on opposite sides of the support, one of the gears meshing with the pinion and having a hub riding in the hole, the other gear having a hub, means securing the hubs in abutment, and a circular rib on said one gear engaging the support and providing a limited but adequate bearing contact.

ALBERT N. WOODRUFF.